US012779546B2

(12) United States Patent
Fu et al.

(10) Patent No.: US 12,779,546 B2
(45) Date of Patent: Nov. 3, 2026

(54) MASS DAMPER AND CUTTING TOOL

(71) Applicant: MAQ AB, Saltsjö-Boo (SE)

(72) Inventors: Qilin Fu, Solna (SE); Cornel-Mihai Nicolescu, Knivsta (SE); Amir Rashid, Upplands Väsby (SE)

(73) Assignee: MAQ AB, Saltsjö-Boo (SE)

( * ) Notice: Subject to any disclaimer, the term of this patent is extended or adjusted under 35 U.S.C. 154(b) by 0 days.

(21) Appl. No.: 16/976,434

(22) PCT Filed: Feb. 28, 2018

(86) PCT No.: PCT/SE2018/050192
§ 371 (c)(1),
(2) Date: Aug. 27, 2020

(87) PCT Pub. No.: WO2019/168448
PCT Pub. Date: Sep. 6, 2019

(65) Prior Publication Data
US 2021/0039172 A1 Feb. 11, 2021

(51) Int. Cl.
*B23B 29/02* (2006.01)
*B23B 27/00* (2006.01)
*B23B 27/16* (2006.01)

(52) U.S. Cl.
CPC ............ *B23B 27/002* (2013.01); *B23B 27/16* (2013.01); *B23B 29/022* (2013.01)

(58) Field of Classification Search
CPC ................ B23B 29/022; B23B 27/002; B23B 2250/16; B23B 2226/33; B23B 2260/068; B23C 5/003; B23C 2250/16; B23Q 11/0032; F16F 15/08; F16F 15/085; F16F 15/124; F16F 15/1245; F16F 15/126; F16F 2224/025
USPC .......................................... 408/143; 409/141
See application file for complete search history.

(56) References Cited

U.S. PATENT DOCUMENTS 2,641,940 A * 6/1953 White .................. B23B 29/022 408/143
3,230,833 A * 1/1966 Shurtliff ................ B23B 29/022 409/141
3,242,791 A * 3/1966 Smith ..................... F16F 7/108 188/379
3,447,402 A 6/1969 Ray
3,598,498 A 8/1971 Holmen
(Continued)

FOREIGN PATENT DOCUMENTS

CA 3034638 A1 * 3/2018 ............ B23C 5/003
CN 102345333 A 2/2012
(Continued)

OTHER PUBLICATIONS

Description WO2018235587A1 (translation) obtained at https://worldwide.espacenet.com/ (last visited May 23, 2022).*
(Continued)

*Primary Examiner* — Ryan Rufo
(74) *Attorney, Agent, or Firm* — RMCK Law Group, PLC

(57) ABSTRACT

Mass damper for a cutting tool, the mass damper comprising at least one damping mass; and at least one spring element arranged to support the damping mass, wherein the spring element comprises a nanostructure with a structural size of 100 nm or less in at least one dimension. A cutting tool comprising the damping mass is also provided.

13 Claims, 6 Drawing Sheets

(56) References Cited

U.S. PATENT DOCUMENTS

| | | | | |
|---|---|---|---|---|
| 3,642,378 | A * | 2/1972 | Hahn | B23B 29/022 408/143 |
| 3,643,546 | A | 2/1972 | Richter et al. | |
| 3,690,414 | A * | 9/1972 | Aggarwal | B23Q 11/0032 188/378 |
| 4,553,884 | A * | 11/1985 | Fitzgerald | B23B 29/022 408/143 |
| 5,095,786 | A | 3/1992 | Bellinghausen et al. | |
| 5,810,528 | A | 9/1998 | O'Connor et al. | |
| 7,028,997 | B2 * | 4/2006 | Takahashi | B23B 29/022 82/158 |
| 9,855,611 | B2 * | 1/2018 | Eichelberger | B23B 29/022 |
| 10,500,648 | B1 * | 12/2019 | Saffouri | B33Y 80/00 |
| 10,801,329 | B2 * | 10/2020 | Garay | B22F 7/08 |
| 2003/0147707 | A1 * | 8/2003 | Perkowski | F16F 7/108 407/30 |
| 2003/0147712 | A1 * | 8/2003 | Kai | B23B 31/02 409/141 |
| 2005/0258580 | A1 * | 11/2005 | Digernes | B23B 29/022 267/137 |
| 2006/0275090 | A1 * | 12/2006 | Onozuka | B23B 29/022 408/143 |
| 2012/0121349 | A1 | 5/2012 | Mihic et al. | |
| 2015/0231706 | A1 * | 8/2015 | Frank | B23B 27/002 407/32 |
| 2015/0375305 | A1 | 12/2015 | Filho | |
| 2016/0067787 | A1 | 3/2016 | Giannetti | |
| 2016/0214182 | A1 * | 7/2016 | Eichelberger | F16F 7/015 |
| 2017/0056977 | A1 * | 3/2017 | Eichelberger | B23B 27/002 |
| 2018/0281074 | A1 * | 10/2018 | Eichelberger | B23B 27/002 |

FOREIGN PATENT DOCUMENTS

| | | | | |
|---|---|---|---|---|
| CN | 104640655 | A | 5/2015 | |
| CN | 104907605 | A | 9/2015 | |
| CN | 105134866 | A | 12/2015 | |
| EP | 0000785 | B1 | 8/1981 | |
| EP | 0012324 | B1 | 2/1982 | |
| EP | 0021844 | B1 | 6/1982 | |
| EP | 0005543 | B1 | 7/1983 | |
| EP | 0003262 | B1 | 11/1985 | |
| EP | 0227417 | B1 | 3/1994 | |
| EP | 0382980 | B1 | 6/1994 | |
| EP | 0453117 | B1 | 11/1995 | |
| EP | 1266710 | A1 | 12/2002 | |
| EP | 1467871 | B1 | 7/2007 | |
| EP | 1700871 | B1 | 9/2007 | |
| EP | 1534868 | B1 | 10/2007 | |
| EP | 1799180 | B1 | 4/2009 | |
| EP | 1859313 | B1 | 4/2009 | |
| EP | 1241710 | B1 | 9/2009 | |
| EP | 2167013 | B1 | 12/2010 | |
| EP | 2101952 | B1 | 2/2013 | |
| EP | 2161613 | B1 | 8/2013 | |
| EP | 1858631 | B1 | 5/2014 | |
| EP | 2427162 | B1 | 7/2014 | |
| EP | 2630078 | B1 | 8/2015 | |
| EP | 2358631 | B1 | 9/2015 | |
| EP | 2454313 | B1 | 12/2016 | |
| EP | 2961535 | B1 | 1/2018 | |
| EP | 3105773 | B1 | 10/2018 | |
| JP | 05228707 | A * | 9/1993 | |
| JP | H06179103 | A | 6/1994 | |
| JP | 2005186240 | A | 7/2005 | |
| JP | 2011011276 | A | 1/2011 | |
| KR | 20020095047 | A | 12/2002 | |
| WO | 2001053025 | A1 | 7/2001 | |
| WO | 2009125503 | A1 | 10/2009 | |
| WO | 2014007435 | A1 | 1/2014 | |
| WO | 2017138881 | A1 | 8/2017 | |
| WO | 2018044216 | A1 | 3/2018 | |
| WO | WO-2018235587 | A1 * | 12/2018 | C08K 3/36 |
| WO | WO-2019039124 | A1 * | 2/2019 | C08K 3/04 |

OTHER PUBLICATIONS

Description JP2001328022A (translation) obtained at https://worldwide.espacenet.com/ (last visited May 23, 2022).*

Gary M. Gladysz, Krishan K. Chawla, in Voids in Materials, 2015 (available at https://www.sciencedirect.com/topics/chemistry/primary-chemical-bond) (last visited Feb. 2, 2024).*

Chemical bonds (reciting the types of bonds being strong and "weak bonds" or "secondary bonds" (such as dipole-dipole interactions, the London dispersion force, and hydrogen bonding)) (available at https://en.wikipedia.org/wiki/Chemical_bond) (last visited Feb. 2, 2024).*

3M: "3M Viscoelastic Damping Polymer 112 Series," Technical Data, May 2017, Retrieved from Internet: http://multimedia.3m.com/mws/media/828134O/3m-viscoelastic-damping-polymer-112-series.pdf?&fn=Viscoelastic%20Damping%20Polymers%2011, 8 pages.

PCT International Preliminary Report on Patentability dated Jun. 18, 2020 for International Application No. PCT/SE2018/050192, 24 pages.

PCT International Search Report and Written Opinion dated Nov. 26, 2018 for International Application No. PCT/SE2018/050192, 13 pages.

Fu, Qilin, "High dynamic stiffness nano-structured composites for vibration control—A Study of applications in joint Interfaces and machining systems", University Dissertation from KTH Royal Institute of Technology, Stockholm, 2015 (81 pages).

Japanese Office Action and English Machine Translation dated Mar. 16, 2021 for JP Patent Application No. 2020-545279, 8 pages.

Fu, Q. et al., "Joint interface characterization method using frequency response measurements on assembled structures only: theoretical development and experimental validation on a workholding fixture for machining," Int J Adv Manuf Technol, Mar. 2015, vol. 77, https://doi.org/10.1007/s00170-014-6539-3, pp. 1213-1228.

* cited by examiner

MASS DAMPER AND CUTTING TOOL

CROSS-REFERENCE TO RELATED APPLICATIONS

This application is a 371 U.S. National Stage of International Application No. PCT/SE2018/050192, filed Feb. 28, 2018. The disclosure of the above application is incorporated herein by reference in its entirety.

TECHNICAL FIELD

The present disclosure generally relates to a mass damper. In particular, a mass damper for a cutting tool and a cutting tool comprising the mass damper, are provided.

BACKGROUND

Cutting tools are usually implemented as cantilever structures and their stiffness substantially decreases with an increased overhang length to diameter ratio. When machining a metal workpiece with a cutting tool, the cutting generates periodic forces on the cutting tool and vibrations arise. Vibrations of the cutting tool during a machining process are undesirable for several reasons. The surface of the workpiece may be destroyed, the cutting tool may break, the machining process may fail etc.

One known solution to suppress vibrations of cutting tools is to provide a tuned mass damper comprising a damping mass such that the vibration energy of the cutting tool is transmitted to the added damping mass. Thereby, the added damping mass vibrates instead of the cutting tool and the cutting tool can be held steady during operation.

In order for mass dampers to function efficiently, it is important to match the resonance frequency of the mass damper to the vibration frequency of the vibrating cutting tool. For this purpose, some cutting tool mass dampers are provided with a tuning mechanism to adjust or tune the resonance frequency of the mass damper. Furthermore, some prior art cutting tools are provided with complex mechatronic parts for measuring the vibration frequency of the cutting tool and for adjusting the stiffness of a spring element in response to measured vibration frequency.

U.S. Pat. No. 3,447,402 A discloses a machine tool boring bar body assembly. The assembly comprises a circular boring bar body having a central bore, ring-shaped viscoelastic absorber elements, a cylindrical damper mass and a tuning mechanism.

US 2016067787 A1 discloses a boring bar for machining operations. The boring bar has an internal chamber within which a vibration dampening mass is supported at each axial end by resilient buffer members. A vibration adjusting piston is linearly moveable with the tool holder and has dampening adjustment engagement with the mass.

The tuning process required for prior art cutting tools is intricate for end users. In addition, an erroneous tuning may lead to costly damages of the tool and/or the workpiece during machining. Calling a professional service technician to make the correct tuning is expensive for most end users.

SUMMARY

One object of the present disclosure is to provide a mass damper for a cutting tool that provides an automatic self-tuning.

A further object of the present disclosure is to provide a mass damper for a cutting tool that provides a reliable and efficient vibration damping over time.

A still further object of the present disclosure is to provide a mass damper that enables the use of a damping mass having a relatively large volume (relative to the cutting tool) and/or the use of a relatively compact and stiff cutting tool.

A still further object of the present disclosure is to provide a mass damper for a cutting tool that has a simple, cheap and/or reliable construction.

A still further object of the present disclosure is to provide a cutting tool comprising a mass damper which cutting tool solves one, several or all of the foregoing objects.

According to one aspect, there is provided a mass damper for a cutting tool, the mass damper comprising at least one damping mass; and at least one spring element arranged to support the damping mass, wherein the spring element comprises a nanostructure material with a structural size of 100 nm or less in at least one dimension.

Throughout the present disclosure, the structural size of the nanostructure may alternatively be referred to as a grain size. The nanostructure of the spring element having a structural size of 100 nm or less in at least one dimension provides for a stiffness that is dependent on the vibrational frequency of the spring element. Thereby, a self-tuning function can be realized in the mass damper. The mass damper thereby constitutes a self-tuned mass damper.

A wide range of materials may have a nanostructure material with a structural size of 100 nm or less in at least one dimension. Examples include polymeric materials, resin, such as thermoset resin (resin prior to a curing process), nanocellulose, metal and graphene. Further examples of nanostructure materials with a structural size of 100 nm or less in at least one dimension include various materials doped with nanoparticles (e.g. carbon nanoparticles and the like), nanofibers (e.g. carbon nanotubes) and nanoflakes (e.g. graphene nanoflakes). For example, polymers may be doped with these dopants. Nanostructure materials according to the present disclosure may or may not be cross-linked.

Throughout the present disclosure, a nanostructure may be referred to as a material microstructure observed at the nm scale (e.g. one billionth of a meter), such as on the atomic or molecular level. For the purpose of this application, the term "nanostructure" typically refers to structures having a minor dimension that is greater than about 1 nanometer but typically substantially less than about 100 nm. The nanostructure of the spring element may have a structural size of 100 nm or less in at least one dimension at room temperature (20° C.) or at typical machining environment temperatures (e.g. 0° C. to 60° C.). The nanostructure material of the spring element according to the present disclosure may be prepared by a synthetic approach, such as mixing (e.g. adding nanoparticles into thermoset resin) and blending (e.g. mixing thermoset resin and polymeric materials, and then heat up to obtain a well-distributed mixture of substances that cannot be separated from each other), top-down patterned approaches including chemical vapor deposition (CVD) or molecular beam epitaxy (MBE).

The nanostructure material of the spring element may have a structural size of 100 nm or less in at least two dimensions. Alternatively, or in addition, the nanostructure material of the spring element may have a structural size of 40 nm or less, such as 20 nm or less, in at least one dimension, such as in two dimensions or in three dimensions. The spring element may be constituted by a solid piece of nanostructure material.

Identification of the nanostructure size can be made by means of a scanning electron microscope method, a transmission electron microscope method and an X-ray diffraction method. The X-ray diffraction method measures the dispersion of the X-ray diffraction pattern to decide the particle size.

The damping mass may be supported by the spring element on only one end or side of the damping mass and the damping mass may be unsupported on an opposite end or side. This may be suitable when the damping mass has a relatively short length. The damping mass may be supported by only one spring element on one end of the damping mass, e.g. by only one spring element constituted by a solid piece of nanostructure material. Alternatively, the damping mass may be supported by two or more spring elements on only one end of the damping mass. In this case, the spring elements may be arranged in a stack.

As a further alternative, the spring element may be placed on the external surface of the damping mass (i.e. between the ends of the damping mass) along the axis of the cutting tool, on one or multiple locations. For example, grooves may be formed on an external cylindrical surface of the damping mass and the spring element is placed in the grooves, in contact with a cavity surface of a tool body.

Throughout the present disclosure, the nanostructure material may be amorphous. The nanostructure material may for example comprise multiple types of weak bonding, e.g. Van der Waals bonding. Alternatively, or in addition, the activation energy of the nanostructure material may be on the temperature band between 0° C. and 60° C. The temperature band or range between 0° C. and 60° C. may constitute a temperature range of a typical machining environment.

The spring element may be connected to the damping mass by an adhesive connection, an interference fit, or a force fit, such as a press fit. The nanostructure material of the spring element may be self-adhesive (e.g. comprising, or being constituted by, a sticky material). In this case, the nanostructure material can adhere to the damping mass without using any additional adhesive. In some applications, the nanostructure material needs not to be heated to provide the adhesive connection by means of the nanostructure material itself. Alternatively, an additional adhesive may be applied to provide the adhesive connection. According to one variant, the spring element according to the present disclosure does not comprise 3 M® 112 viscoelastic polymers.

According to a further aspect, there is provided a cutting tool comprising a tool body and a mass damper according to the present disclosure arranged to damp vibrational movements of the damping mass relative to the tool body. The cutting tool may be constituted by a metal cutting tool. The cutting tool may alternatively be referred to as a machine tool. Vibrational movements of the damping mass according to the present disclosure are dominated by radial and torsional vibrations.

The cutting tool may be stationary or rotatable. In either case, a rotation relative to a workpiece may be generated to machine the workpiece.

The tool body may comprise a cavity and the damping mass may be arranged within the cavity. Alternatively, the damping mass may be arranged external on a cutting tool.

In a further example, the cutting tool may comprise multiple cavities and one or several damping masses arranged in each of the cavities. For example, a cutting tool with multiple cutting inserts (e.g. a milling tool), the cutting tool may comprise multiple cavities located under each of the cutting inserts, where one or multiple damping masses are displaced.

Each of the damping mass and the cavity may have a conical shape substantially conforming to each other. The conical shapes of the damping mass and the cavity may each taper towards a base of the cutting tool and taper away from a cutting head of the cutting tool. The conical shape of the damping mass increases the stiffness of the tool body since the bending moments of inertia on the tool body are increased at locations having a predefined distance to a cutting force loading point.

The cross section of the cavity and the damping mass are not limited to a circular shape. For example, the cross section may be in the shape of a square.

The cutting tool may further comprise a viscous fluid having a frequency dependent stiffness and the viscous fluid may be arranged within the cavity.

The viscous fluid may thereby constitute a part of the mass damper. The viscous fluid may comprise a nanostructure material having a structural size of 100 nm or less in at least one dimension, such as between 1 nm and 100 nm, such as between 5 nm and 100 nm, such as between 5 nm and 20 nm. Alternatively, or in addition, the viscous fluid may comprise nanosized fillers.

The nanostructure material of the spring element may have a frequency dependent stiffness such that a resonance frequency of the damping mass substantially matches, or matches, a vibration frequency of the tool body over a vibration frequency range up to 4000 Hz, such as from 100 Hz to 1000 Hz, such as from 200 Hz to 600 Hz. A substantial match in this regard covers differences between resonance frequencies and vibration frequencies of up to 20%, such as up to 10%, such as up to 5%, such as up to 1%, as well as perfect matches. The stiffness of the spring element may be proportional to a vibration frequency of the cutting tool with a power of two.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1A:
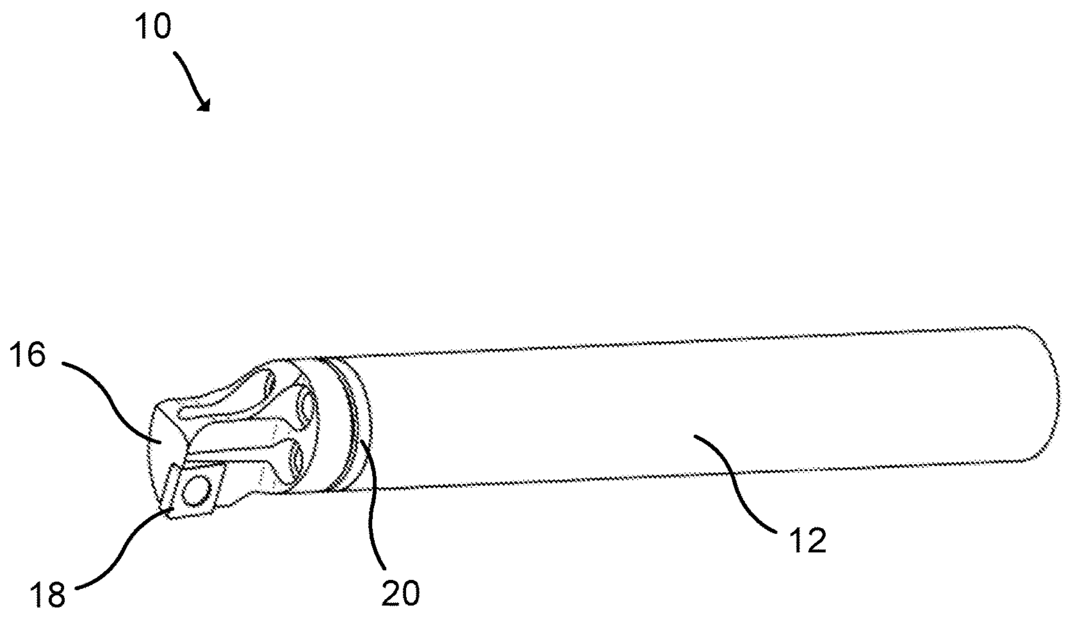
FIG. 1*a*: schematically represents a perspective view of a cutting tool.

In the following, a mass damper for a cutting tool and a cutting tool comprising the mass damper, will be described.

The same reference numerals will be used to denote the same or similar structural features.

Figure 1B:
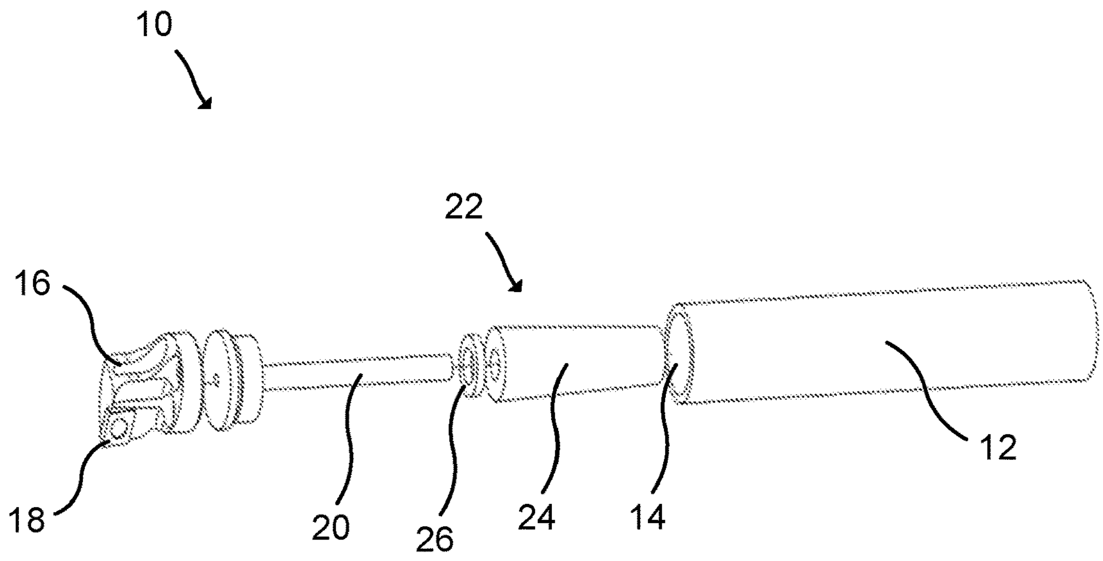
FIG. 1*b*: schematically represents an exploded perspective view of the cutting tool in FIG. 1*a;*

FIG. 1*a* schematically represents a perspective view of a cutting tool 10 and FIG. 1*b* schematically represents an exploded perspective view of the cutting tool 10 in FIG. 1*a*. With collective reference to FIGS. 1*a* and 1*b*, the cutting tool 10 comprises a tool body 12 having a cavity 14, a cutting head 16 holding a cutter 18, and an adapter 20. The adapter 20 serves to rigidly connect the cutting head 16 to the tool body 12. The adapter 20 further comprises coolant channels (not denoted) for delivering coolant to and from the cutting head 16.

The cutting tool 10 further comprises a mass damper 22. The mass damper 22 of this example comprises one damping mass 24 and one spring element 26 for supporting the damping mass 24. The damping mass 24 may for example be made of tungsten material. In the example of FIGS. 1*a* and 1*b*, the damping mass 24 is configured to be arranged within the cavity 14 of the tool body 12. The damping mass 24 is displacably supported relative to the tool body 12 by means of the spring element 26. The damping mass 24 can be radially and/or rotary displaced (with respect to a longitudinal axis of the cutting tool 10) within the cavity 14 against deformation of the spring element 26. The spring element 26 comprises a nanostructure material with a structural size of 100 nm or less in at least one dimension. In this example, the spring element 26 is held between the damping mass 24 and the adapter 20. Moreover, the spring element 26 of this example is self-adhesive and thereby adheres to the damping mass 24 and to the adapter 20. The damping mass 24 may alternatively be connected to the exterior of the tool body 12 by means of the spring element 26.

In this example, the spring element 26 is annular and substantially flat, e.g. the diameter of the spring element 26 is at least 30 times the thickness of the spring element 26. However, alternative shapes of the spring element 26 are possible, including symmetrical shapes, e.g. O-ring shape, asymmetrical shapes, e.g. having varying extensions in radial directions, and spring elements 26 comprising an amorphous nanostructure material. The thickness of the spring element 26 may for example be approximately 1 mm.

The spring element 26 constitutes the only support of the damping mass 24 relative to the tool body 12. Thus, the damping mass 24 is unsupported on the right end in FIG. 1*b*. In this example, the spring element 26 is provided on the end of the damping mass 24 facing the cutting head 16. However, the spring element 26 may alternatively be provided on the opposite end of the damping mass 24. Although only one spring element 26 is provided on one end of the damping mass 24 in FIGS. 1*a* and 1*b*, a stack of several spring elements 26 may alternatively be provided on this end of the damping mass 24.

In prior art cutting tools, the mass is usually supported at both ends by a spring element, such as in the boring bar of US 2016067787 A1. Due to the necessity of the tuning mechanism, the mass needs at least two spring elements to become isolated from the tool body. In contrast, with the mass damper 22 according to the present disclosure, the damping mass 24 may be supported by a spring element 26 on only one of its ends since the tuning mechanism is eliminated.

When designing a damped cutting tool 10, the cutting tool 10 should have an optimal stiffness and an optimal damping. In a typical prior art cantilever cutting tool, such as the boring bar of US 2016067787 A1, the strives for a stiffer cutting tool and for a larger damping mass are conflicting. A larger damping mass requires a longer, and less stiff, cutting tool.

However, an increased stiffness in the mass damper 22 according to the present disclosure will reduce the movement amplitude of the damping mass 24 and avoid collision between the damping mass 24 and the tool body 12. For example, if the tool body 12 has an external diameter of 20 mm and a length of 200 mm, the length of a prior art damping mass may be 40 mm.

By supporting the damping mass 24 from only one end, a space of 4 mm can be gained for the damping mass 24 in the axial direction. Thus, with the mass damper 22 according to the present disclosure, the damping mass 24 can be made 4 mm longer, e.g. 10% heavier, and the spring elements 26 can increase the stiffness by 10% while maintaining the same Eigen frequency.

When the mass damper 22 is vibrating with the same amount of energy, an increase in stiffness by 10% on the spring elements 26 will reduce the vibration amplitude of the damping mass 24 by 5%. The 5% reduction of vibration amplitude the damping mass 24 will reduce the requirements on the surface finish of the cavity 14 under the same design, and thereby lower production costs.

Moreover, by supporting the damping mass 24 by one or more spring elements 26 on only one end of the damping mass 24, an axial space within the cavity 14 is now "free". This axial space may for example be 4 mm. The volume of the whole cavity 14 can thereby be reduced, e.g. by reducing the axial depth of the cavity 14 with 4 mm. Thereby, the stiffness of the tool body 12 can be increased. With the same damping efficiency but a higher stiffness in the tool body 12, the vibration amplitude of the cutting tool 10 will be further reduced to benefit the machining process.

A damping mass 24 according to FIGS. 1*a* and 1*b* may however alternatively comprise one or more spring elements 26 provided on each end of the damping mass 24, such that the damping mass 24 is supported by one or more spring elements 26 on two ends. This may be suitable when the damping mass 24 has a relatively long length.

Figure 2:
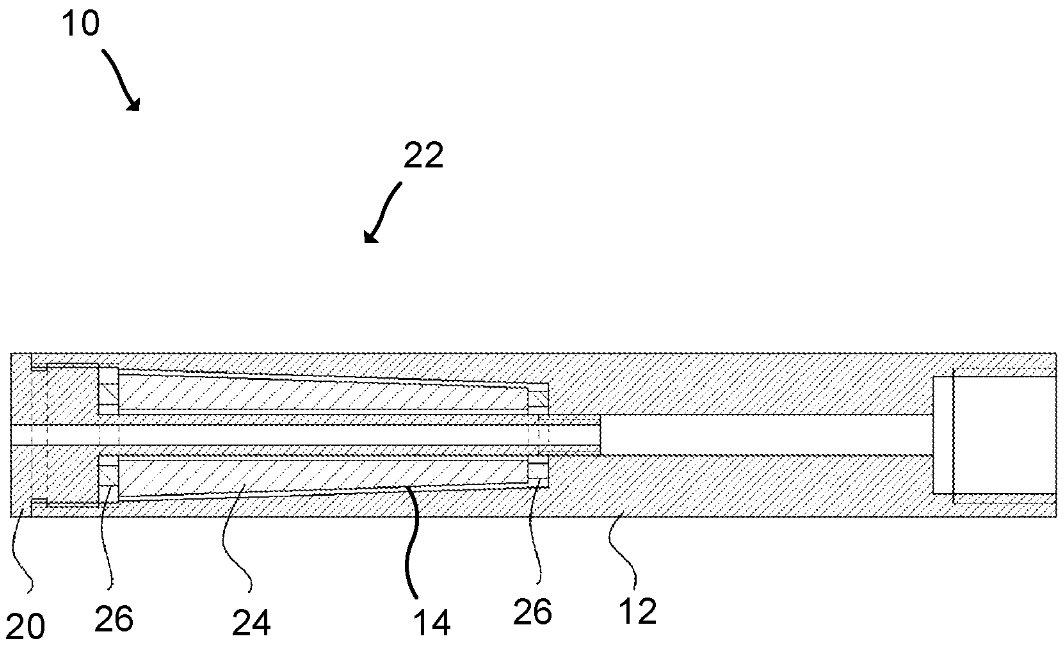
FIG. 2: schematically represents a cross sectional view of a further cutting tool.

FIG. 2 schematically represents a cross sectional view of a further cutting tool 10. Mainly differences with respect to FIGS. 1*a* and 1*b* will be described.

The cutting tool 10 in FIG. 2 comprises a conical damping mass 24 and a substantially conforming conical cavity 14. The radial clearance between the damping mass 24 and the cavity 14 is substantially uniform. The conical shapes of the damping mass 24 and the cavity 14 taper away from the cutter end (to the left in FIG. 2) of the cutting tool 10, and taper towards a support end (to the right in FIG. 2) of the cutting tool 10. Due to the conical shapes of the damping mass 24 and the cavity 14 of the tool body 12, the tool body 12 has a higher stiffness compared to a case with a perfectly cylindrical damping mass and a perfectly cylindrical cavity. The higher stiffness of the tool body 12 increases the vibration frequency of the cutting tool 10 and the mass damper 22 can thereby use a smaller damping mass 24 in order to match the Eigen frequency or resonance frequency of the mass damper 22 to the cutting tool 10. The increased stiffness of the tool body 12 reduces the vibration amplitude of the cutting tool 10, which favors the machining operations.

Furthermore, the mass damper 22 in FIG. 2 comprises one spring element 26 on each end of the damping mass 24. The two spring elements 26 support the damping mass 24 within the cavity 14 and allow radial and/or rotary movements of the damping mass 24 within the cavity 14. Although only one spring element 26 is provided on each end of the damping mass 24 in FIG. 2, a stack of several spring elements 26 may alternatively be provided on each end of the damping mass 24. Also the spring elements 26 in FIG. 2 each comprises a nanostructure material with a structural size of 100 nm or less in at least one dimension.

Figure 3:
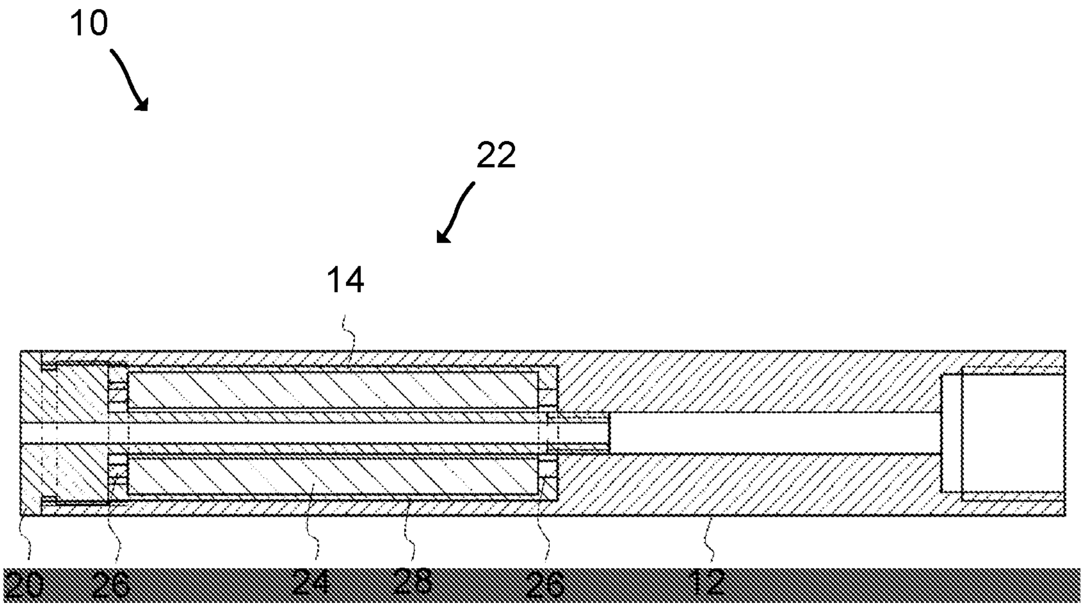
FIG. 3: schematically represents a cross sectional view of a further cutting tool.

FIG. 3 schematically represents a cross sectional view of a further cutting tool 10. Mainly differences with respect to FIGS. 1*a*, 1*b* and 2 will be described.

The cutting tool 10 in FIG. 3 comprises a cylindrical damping mass 24 supported on each end by a spring element 26 comprising a nanostructure material with a structural size of 100 nm or less in at least one dimension. The cavity 14 between the damping mass 24 and the tool body 12 is filled with a viscous grease or viscous fluid 28. Also the viscous fluid 28 has a frequency dependent stiffness. The size of the molecules and the types of weak bonding inside the viscous fluid 28 will contribute to determine the stiffness variation over the targeted frequency range, typically between 100 Hz and 1000 Hz. The structural size of the viscous fluid 28 is between 1 nm and 100 nm, such as between 5 nm and 100 nm, preferably between 5 nm and 20 nm, to provide the frequency dependent stiffness property. The internal weak bonding of the viscous fluid 28 is in the form of Van der Waals bonding between C—H, H—O, H—H etc. The viscous fluid 28 may alternatively, or in addition, contain nanosized fillers (e.g. particles, fibers and/or flakes) to introduce the nanostructure and the weak bonding. Specific examples of particle fillers include metallic particles, ceramic particles and polymer particles. Also the conical cavity 14 in FIG. 2 may be filled with the viscous fluid 28.

Figure 4:
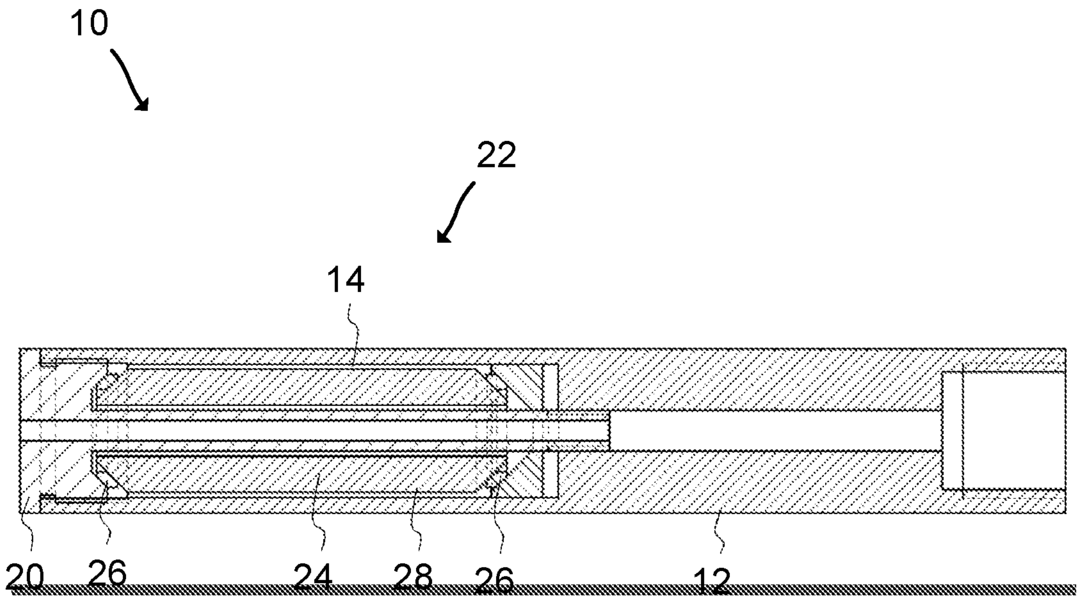
FIG. 4: schematically represents a cross sectional view of a further cutting tool.

FIG. 4 schematically represents a cross sectional view of a further cutting tool 10. Mainly differences with respect to FIGS. 1*a*, 1*b*, 2 and 3 will be described.

The cutting tool 10 in FIG. 4 comprises a damping mass 24 that is chamfered on each end. As an alternative, only one of the ends may be chamfered. Each chamfered section of the damping mass 24 is in contact with a spring element 26. The contact geometry between damping mass 24 and the spring element 26 is thus not limited to a straight geometry and a chamfered contact geometry according to FIG. 4 can also be used.

Figure 5A:
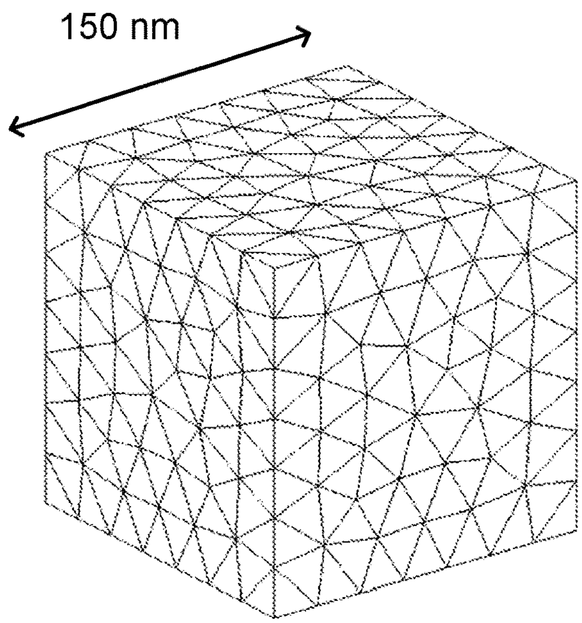
FIG. 5*a*: schematically represents a nanostructure material having a nanostructure in three dimensions.
Figure 5B:
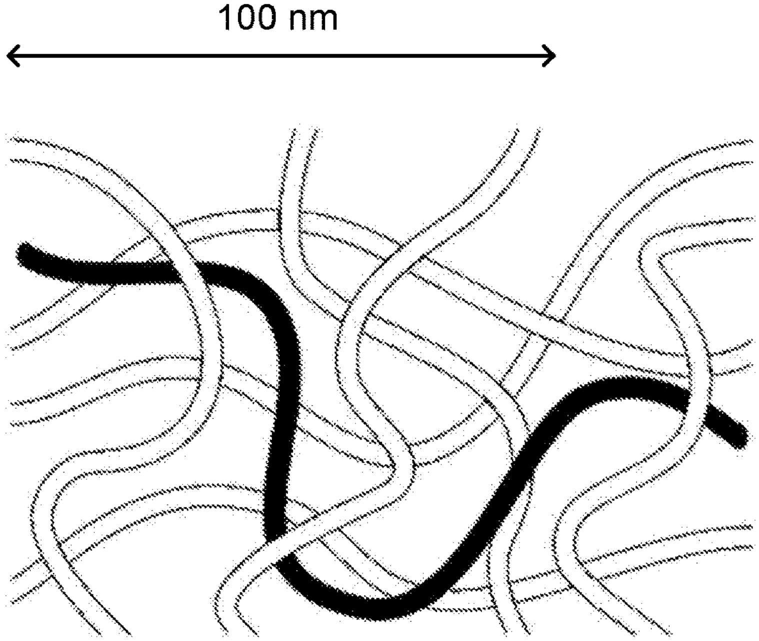
FIG. 5*b*: schematically represents a nanostructure material having a nanostructure in two dimensions.

FIGS. 5*a* and 5*b* schematically represent a nanostructure material having a nanostructure in three dimensions and two dimensions, respectively. In FIG. 5*a*, the structural size is approximately 20 nm in three dimensions. In FIG. 5*b*, the nanostructure material comprises long chain molecules with a structural size below 20 nm in two dimensions. In FIG. 5*b*, the long chain molecules are entangled. The thickness of a chain corresponds to the thickness of one molecule.

Most engineering materials have a nearly constant stiffness over the frequency range between 20 Hz and 4000 Hz, such as rubbers, elastomers, steels and ceramics. However, the stiffness of some materials becomes sensitive to temperature when the material is experiencing a phase change (e.g. re-polymerization and re-crystallization), such as memory alloys. The sensitive behavior of material stiffness over temperature is caused by the phase transformation where the structural size inside the materials are reduced to 100 nm or less, such as to 40 nm or less, such as to 20 nm or less.

The theory of time-temperature superposition explains that materials having a mechanical property sensitive to temperature are also sensitive to frequency changes. Such materials undergo a decrease in stiffness when the temperature is increased and an increase in stiffness when the temperature is decreased. This property makes such materials a good choice for the one or more spring elements 26 in order to provide a self-tuning effect of the mass damper 22.

Viscoelastic materials do not necessarily have the described frequency dependent stiffness property. Typical viscoelastic materials, such as rubbers and elastomers, have a nominal structural size between 100 nm and 1000 nm at room temperature near 20° C. and do not show any significant frequency dependent mechanical properties. Materials having a nanostructure where the structural size is 100 nm or less, preferably 40 nm or less, more preferably 20 nm or less, in at least one dimension, will provide a frequency dependent mechanical stiffness. For cutting tool applications, the nanostructure material shall have the nanostructure with a structural size of 100 nm or less at temperatures of industrial machining operation environments (e.g. 0° C. to 60° C.) and/or at room temperature (e.g. approximately 20° C.).

When the nanostructure of the material has one dimension that is 100 nm or less, such as 20 nm or less, the nanosized grains form massive grain boundaries with weak bonding between molecules. These weak bonding are sensitive to temperature. A slight temperature rise will provide the thermal energy to overcome the activation energy of the bonding in the grain boundaries. The time-temperature superposition theory tells that the decrease of excitation frequency (increase of time) has the same effect as increase of temperature.

A nanostructure material according to the present disclosure may be constituted by an amorphous material. In such amorphous material, the stiffness of the material changes gradually over a wide temperature band, such as over a temperature range in a typical machining environment. Furthermore, a nanostructure material according to the present disclosure may have a nanostructure with long chain molecules (nanozise in cross section of the molecule) entangled with each other. Examples of such materials include thermoset resin and nanocellulose. Nanostructure materials according to the present disclosure, such as thermoset resin, can lose 90% of stiffness over a temperature range between 0° C. and 60° C., because there are multiple types of weak bonding (inter-molecular and interatomic Van der Waal bonding) overcoming the activation energy at different temperatures, such as H—H Van der Waal bond, H—C Van der Waal bond, O—H Van der Waal bond etc. The gradual change of stiffness over temperature reflects, i.e. corresponds to, the gradual change of stiffness over frequency, i.e. the preferred frequency dependent stiffness for self-tuning mass damper applications.

Rubbers may also have a temperature dependent stiffness, and the stiffness of rubbers typically varies drastically over the temperature band between −50° C. and 0° C., which is outside the targeted machining operation environment. This means that the activation energy of the weak bonding is in the temperature band between −50° C. and 0° C. Moreover, the extent of stiffness change over a frequency range between 100 Hz and 1000 Hz for rubbers is too low to achieve the self-tuning function.

Furthermore, in order to stabilize the stiffness property of a material over a targeted frequency range, nanostructured particles, fibers and/or flakes can be used as fillers and mixed to the material (e.g. to a thermoset resin material or a nanocellulose material). Examples of such fillers include nanostructured polymer particles (e.g. ground down thermoplastic polymers or elastomers), nanostructured fibers (e.g. carbon nanotubes) and nanostructured flakes (e.g. graphene).

After being heated up within a typical machining environment, the nanostructure material does not necessarily change into a fluid phase. The nanostructure material can undergo a re-polymerization process and form another chemical compound that is stable on the elevated temperature with a different stiffness property. After being heated up to a higher temperature, for example to a temperature of 120° C. or higher, the re-polymerization process of the nanostructure material can become irreversible, and the nanostructure material will lose the frequency dependent stiffness property.

Materials with a nanostructure, where at least one dimension is 100 nm or less, such as 20 nm or less, will have a frequency dependent stiffness controlled by the bonding strength in the grain boundaries over a typical machining temperature. The mass damper 22 comprising one or more spring element 26 having such nanostructure material will have a self-tuning function since the stiffness of the spring element 26 increases when the vibration frequency of the cutting tool 10 increases. The nanostructure material of the spring element 26 according to the present disclosure may have a structural size of 100 nm or less, such as 40 nm or less, such as 20 nm or less, in one direction, two directions, or three directions. The mass damper 22 according to the present disclosure thereby obviates complex mechatronics parts on a cutting tool holder that measure vibration frequency and then adjust the stiffness of the spring elements based on the measured vibration frequency.

It is important to match the Eigen frequency $f_n$ of the mass damper 22 with the vibration frequency $f_t$ of the cutting tool 10 in order to obtain the highest damping efficiency. The Eigen frequency $f_n$ of the mass damper 22 should match with the vibration frequency $f_t$ of the tool 10, and can be expressed as:

$$f_n = f_t = \frac{1}{2\pi}\sqrt{\frac{k}{m}} \tag{1}$$

where k is the stiffness of the spring element 26 and m is the mass of the damping mass 24. The stiffness k of the spring element 26 depends for example on the geometry and material used.

When the vibration frequency of the cutting tool 10 decreases, the stiffness of the spring element 26 will be reduced. As a consequence, the Eigen frequency of the mass damper 22 will be reduced to match the frequency change in the cutting tool 10. Conversely, when the vibration frequency of the cutting tool 10 increases, the stiffness of the spring element 26 will be increased and the Eigen frequency of the mass damper 22 will be increased to match the frequency change in the cutting tool 10. This self-tuning effect of the mass damper 22 is highly valuable for the machine tool industry, for example in cases where the vibration frequency is drifting over time and is different in different machines. The self-tuning property of the mass damper 22 eliminates the intricate tuning process necessary for prior art cutting tools.

By reformulating equation (1), the stiffness k of the spring element 26 can be expressed as:

$$k = m\times(2\pi f_n)^2 = m\times(2\pi f_t)^2 \tag{2}$$

The mass m of the damping mass 24 is usually a fixed term. The stiffness of the spring element 26 is thus dependent on the vibration frequency $f_t$ of the cutting tool 10. The stiffness of the spring element 26 may change proportionally to the vibration frequency of the cutting tool 10 with a power of two. The frequency dependent stiffness may take place over various frequency bands. For turning and milling tools, the vibration frequency typically changes between 100 Hz and 1000 Hz. The stiffness of the material of the spring element 26 therefore needs to change 100 times to cover the full range of frequency change. For metal cutting applications, the vibration frequency typically changes less. For example, if the vibration frequency changes between 200 Hz and 600 Hz, the stiffness of the material of the spring element 26 needs to change nine times over the targeted frequency band for making perfect tuning.

Figure 6A:
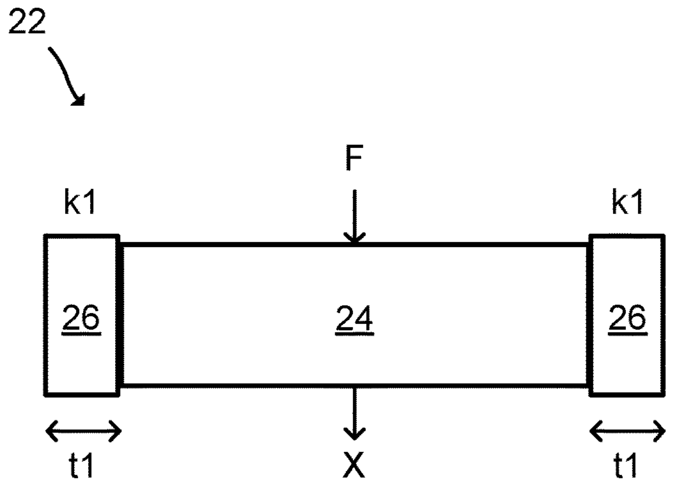
FIG. 6*a*: schematically represents a mass damper comprising a damping mass supported by two spring elements.
Figure 6B:
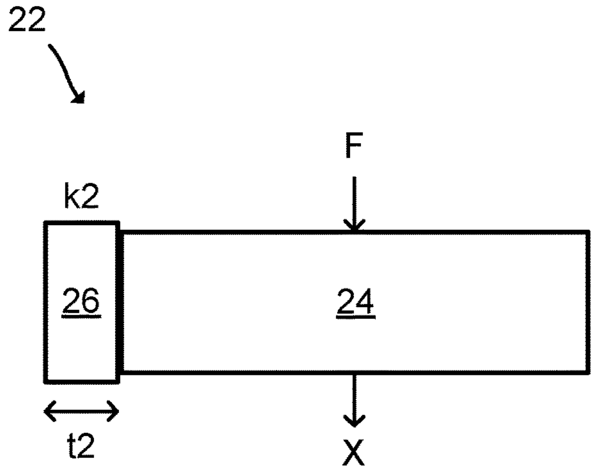
FIG. 6*b*: schematically represents a mass damper comprising a damping mass supported by only one spring element.

FIG. **6*a* schematically represents a mass damper 22 comprising a damping mass 24 supported by two spring elements 26, and FIG. 6*b* schematically represents a mass damper 22 comprising a damping mass 24 supported by only one spring element 26**.

The stiffness $k_{md1}$ of the mass damper 22 in FIG. **6*a*** can be expressed as:

$$k_{md1} = \frac{X}{F} = k_1 + k_1 = 2\frac{G\times A}{t_1} \tag{3}$$

where X is the displacement amplitude of the damping mass 24, F is the force on the damping mass 24, G is the shear modulus of each spring element 26, $t_1$, is the thickness of each spring element 26, and A is the cross sectional area (perpendicular to the thickness) of each spring element 26.

The stiffness $k_{md2}$ of the mass damper 22 in FIG. **6*b*** can be expressed as:

$$k_{md2} = \frac{X}{F} = k_2 = \frac{G\times A}{t_2} \tag{4}$$

where X is the displacement amplitude of the damping mass 24, F is the force on the damping mass 24, G is the shear modulus of the spring element 26, $t_2$ is the thickness of the spring element 26, and A is the cross sectional area (perpendicular to the thickness) of the spring element 26.

If the stiffnesses of the mass dampers 22 in FIGS. **6*a* and 6*b*** are equal, it is implied that:

$$t_2 = \frac{t_1}{2} \tag{5}$$

Thus, by supporting the damping mass 24 on only one end of the damping mass 24, the thickness of the spring element 26 can be further reduced to enable a larger damping mass 24 and/or a shorter (stiffer) tool body 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A cutting tool, comprising:

a tool body; and a mass damper, wherein the mass damper comprises:

at least one damping mass, and at least one spring element arranged to support the damping mass, wherein the at least one damping mass is supported by only one spring element on one end of the damping mass, or the damping mass is supported by only one spring element on each end of the damping mass, wherein the spring element comprises a nanostructure material with a structural size of 100 nm or less in at least one dimension, wherein the nanostructure material of the spring element has a frequency dependent stiffness such that a resonance frequency of the at least one damping mass substantially matches a vibration frequency of the tool body over a vibration frequency range from 200 Hz to 600 Hz, wherein the nanostructure material of the at least one spring element has a frequency dependent stiffness to provide automatic self-tuning such that the resonance frequency of the at least one damping mass substantially matches the vibration frequency of the tool body over a vibration frequency range from 200 Hz to 600 Hz without manual tuning, wherein the nanostructure material of the at least one spring element is amorphous, wherein the nanostructure material of the at least one spring element comprises multiple types of weak bonding, and wherein the stiffness of the at least one spring element varies proportionally to the vibration frequency of the tool body squared according to:

$$k=m\times(2\pi f_t)^2,$$

where k is the stiffness of the least one spring element, m is a fixed mass of the at least one damping mass, and $f_t$ is the vibration frequency of the tool body between the vibration frequency range of 200 Hz to 600 Hz.

2. The cutting tool according to claim 1, wherein the structural size of the nanostructure material of the at least one spring element is 100 nm or less in at least a second dimension in addition to the at least one dimension.

3. The cutting tool according to claim 1, wherein the structural size of the nanostructure material of the at least one spring element is 40 nm or less in the at least one dimension.

4. The cutting tool according to claim 1, wherein the at least one spring element is constituted by a solid piece of nanostructure material.

5. The cutting tool according to claim 1, wherein the at least one damping mass is supported by the at least one spring element on the one end of the at least one damping mass and wherein the at least one damping mass is unsupported by and does not include a spring element on an opposite end.

6. The cutting tool according to claim 1, wherein an activation energy of the nanostructure material corresponds to a thermal energy on a temperature band between 0° C. and 60° C.

7. The cutting tool according to claim 1, wherein the at least one spring element is connected to the at least one damping mass by an adhesive connection, an interference fit, or a force fit.

8. The cutting tool according to claim 1, wherein the tool body comprises a cavity and wherein the at least one damping mass is arranged within the cavity.

9. The cutting tool according to claim 8, wherein each of the at least one damping mass and the cavity has a conical shape substantially conforming to each other.

10. The cutting tool according to claim 8, further comprising a viscous fluid having a frequency dependent stiffness and wherein the viscous fluid is arranged within the cavity.

11. The cutting tool according to claim 10, wherein the viscous fluid comprises a nanostructure material having a structural size of 100 nm or less in at least one dimension.

12. The cutting tool according to claim 10, wherein the viscous fluid comprises nanosized fillers.

13. The cutting tool according to claim 1, wherein the stiffness of the at least one spring element automatically varies as the vibration frequency of the tool body varies.

* * * * *